(12) United States Patent
Fischer et al.

(10) Patent No.: US 6,470,430 B1
(45) Date of Patent: Oct. 22, 2002

(54) PARTITIONING AND MONITORING OF SOFTWARE-CONTROLLED SYSTEM

(75) Inventors: Kerstin Fischer, Bruchköbel; Reinhard Seyer, Rodgau, both of (DE)

(73) Assignee: DaimlerChrysler AG, Stuttgart (DE)

( * ) Notice: Subject to any disclaimer, the term of this patent is extended or adjusted under 35 U.S.C. 154(b) by 202 days.

(21) Appl. No.: 09/596,084

(22) Filed: Jun. 16, 2000

(30) Foreign Application Priority Data

Jun. 17, 1999 (DE) .......................................... 199 27 657

(51) Int. Cl.$^7$ .............................................. G06F 12/14
(52) U.S. Cl. ...................... 711/153; 711/163
(58) Field of Search ................................ 711/153, 163

(56) References Cited

U.S. PATENT DOCUMENTS

| | | | | |
|---|---|---|---|---|
| 5,463,745 A | * | 10/1995 | Vidwans et al. | ............ 712/218 |
| 5,727,178 A | * | 3/1998 | Pletcher et al. | ............. 711/163 |
| 6,052,753 A | * | 4/2000 | Doerenberg et al. | .......... 710/29 |
| 6,292,899 B1 | * | 9/2001 | McBride | ..................... 380/281 |
| 2001/0037450 A1 | * | 11/2001 | Metlitski et al. | ............. 713/152 |

* cited by examiner

*Primary Examiner*—Reba I. Elmore
(74) *Attorney, Agent, or Firm*—Venable; Norman N. Kunitz

(57) ABSTRACT

For reasons of flexibility, efficiency and costs, more and more processes are monitored with the aid of software-controlled electronic devices. As a rule, these are electronic devices that are controlled with the aid of microprocessors. The invention presented herein is aimed at increasing the reliability of these systems and, simultaneously, reduce the expenditure for developing these systems. A processor-monitoring unit is provided for this, which ensures a robust partitioning. This processor monitoring unit controls access to the memory and makes sure that the times for processing program segments and modules are observed.

8 Claims, 3 Drawing Sheets

PARTITIONING AND MONITORING OF SOFTWARE-CONTROLLED SYSTEM

CROSS REFERENCE TO RELATED APPLICATION

This application claims the priority of German patent Application No. 19927657.9-32 filed Jun. 17, 1999, which is incorporated herein by reference.

BACKGROUND OF THE INVENTION

The invention relates to a method for partitioning and monitoring software controlled electronic equipment comprising a processor, at least one read only memory (ROM), at least one read and access memory (RAM) and one monitoring unit.

Flexibility, efficiency and costs are the reason why more and more processes are monitored with the aid of software-controlled electronic equipment. As a rule, electronic equipment of this type is controlled with the aid of microprocessors. The invention introduced herein is designed to increase the reliability of these systems and, at the same time, reduce the expenditure for development. For this, the processor is monitored, thereby ensuring a robust partitioning. The aforementioned processor monitoring controls the memory access and ensures that the processing times for the program sections and program modules are observed.

Known processes from prior art are controlled by flexible, generally software-based electronic equipment. Controls of this type have the advantage of offering extremely high efficiency with respect to control and regulation. These controls in principle always have the same basic structure, consisting of sensing devices, digital processor-controlled information processing and actuators, and can be used for almost all processes, even if handling them is complicated. The actual processing component assumes the specific adaptation to the respective process. As a rule, this adaptation occurs with the aid of control software capable of controlling complex processes. With respect to the software, complex processes require comprehensive software structures, which in many cases are also complex. These are configured to react in accordance with the different process states, to observe the times and to make available sufficient reaction alternatives. The more complex applications and software become, the more difficult it is to create an error-free software. Error-free software is a requirement that plays an important role for security-relevant applications, in particular for the respective electronic equipment. Lengthy development times with extensive and long-lasting test phases result in high costs. The disadvantage is that even after completing all tests, there is no one hundred percent assurance that the software does not still contain hidden errors. Hidden errors are the rule and not the exception. A further disadvantage is that the effects of hidden errors cannot be predicted.

It is possible to react in different ways to this problem. One way consists of setting up a tool chain of error-free tools, which are capable of automatically generating complex problems from requirements. The extensive code created in the process is a disadvantage, not only with respect to its effects on the storage costs, but because fast real-time systems cannot be realized in this way or only with increased expenditure for extremely fast hardware.

Thus it is the object of the invention is to prevent the uncontrolled propagation of software errors and to allow completely independent processes or program modules to run in a microprocessor. In particular, the aim is to prevent a mutual influencing caused by faulty memory access and to take steps to ensure that the independent program modules do not influence each other with respect to time.

SUMMARY OF THE INVENTION

The above object generally is achieved according to the invention by a method for partitioning and monitoring soft-ware controlled electronic equipment comprising a processor, at least one read only memory (ROM), at least one read and access memory (RAM) and one monitoring unit wherein the monitoring unit divides the memories (ROM, RAM) into individual memory areas (module 1, module 2 to module n) by use of a permanently stored allocation table, and assigns these areas permanently to individual program modules, which cannot be influenced by an operating program module, even in case of an error.

The invention builds on the fact that small units are easier to control than large ones. The complexity of small units is limited, which facilitates the overview and transparence. Small units have fewer states and can therefore be tested with less expenditure. However, this is true only if they do not influence each other negatively. The logic behind this is that the sum of all possible states of individual units is lower than the combination of all states. For example, if a system composed of four units with respectively four independent states is considered, 16 test cases are obtained. If the test cases were dependent on each other or could mutually influence each other, this would result in 256 test cases. A division of complex processes into small, independent modules is therefore advantageous.

According to the invention, this problem is solved through a partitioning of memory and time. The memory units are partitioned with the aid of a monitoring unit and an allocation table. For this, the total process is program-technologically divided into individual smaller modules. The individual modules themselves are independent programs or sub-programs. A predetermined, fixed memory area or address space is allocated to each individual module. The allocation of memory area or address space occurs with the aid of an allocation table. For this, previously determined memory boundaries or address boundaries, to which the respective program module must have access, are stored permanently in an allocation table. The areas for code memory, data memory and, if necessary, also the periphery are specified. Permanently stored means that the memory boundaries are not specified as variable, in contrast to prior art, and therefore cannot be changed by running programs, for example, communication software. Permanently stored means that the allocation table is stored in a hardware-type realized memory in such a way that application programs can no longer change the allocation table. The stored memory boundaries cannot be influenced by an operating program module, not even if an error occurs. During an orderly program flow, a monitoring unit ensures that the partitioning is maintained, which is specified in the allocation table by the memory boundaries. If a program module claims an address outside of the memory boundaries fixed in the allocation table, the monitoring unit will diagnose this as error. One basic rule for error detection is that each program module is authorized to access only those areas, which are released for the program module. As far as the data memory and the periphery are concerned, it is true that all memory areas can be read by each program module. However, a write enable applies only to those memory areas, which are allocated to the individual program modules in the allocation table. Each module thus can read all data for the total process, but can effect changes through rewriting only in those areas, which are allocated to it. In the following, the robust partitioning according to the invention is understood to refer to the permanent storage of memory boundaries in a hardware-type allocation table and the fixed allocation of these memory areas to individually enabled program modules.

In addition to the partitioning of the memory and the connected independence in handling the memory, the invention also comprises a monitoring of the time-independence of the individual program modules. This applies in particular to deterministic processes. The time partitioning also occurs with the aid of the allocation table, in which the specified times are permanently stored. As a result, the time monitoring also cannot be influenced by the operating program, not even if an error occurs. If a program is composed of several modules and a result must definitely be made available after a specified time period, it must be ensured that all program modules with their processing times adhere to specified time values. According to prior art, a programmer estimates the times and, if necessary, verifies these times with the aid of tests. If a module functioning as part of a processing chain does not adhere to the specified times, a complete control failure may result. An inexact aid, known per se, is a watchdog, which triggers a restart in the case where a program is totally "hung up." The watchdog can be used with PCs and systems that have no security relevance, but is not acceptable for systems that control, for example, the steering wheel or brake of a vehicle.

According to the invention, the time monitoring occurs advantageously with the aid of an allocation table. In addition to the memory areas, fixed time contingents are allocated to the individual program modules. A violation of the specified data corresponds to a violation of the specification and should not occur. The error can be diagnosed and recorded by the monitoring unit, which monitors the observance of the times specified for the individual program modules. A clear allocation of the error to a specific program module is always possible in this case by means of the allocation table and analog to the monitoring of the memory boundaries. The respective program module is stopped, thus preventing if from effecting the total time behavior of the system.

The following advantages are primarily achieved with the invention:

As a result of the robust partitioning of the memory area and its fixed allocation to the individual program modules and by monitoring these memory boundaries with a monitoring unit, it is always possible to clearly determine in which program module an error has occurred and which memory boundary was violated. Owing to this, errors occurring during the processing of a program-technological task are limited to the area of one program module, which prevents an uncontrolled propagation of the error.

Another advantage of the invention is that no expensive communication software must be implemented, such as is required in prior art for the memory administration and the address administration, as well as for the communication between individual program modules in distributed systems. The communication paths and memory regions are specified in the front-end equipment in the allocation table, so that the communication software can be omitted. The application programs thus require fewer codes, thus resulting in enormous speed advantages for the application itself. The invention is preferably used in real-time systems, which are used for example in electronic stabilizing systems or electronically controlled braking systems and the like of motor vehicles. The invention can furthermore be used, for example, as component of the electronic control equipment in the cockpit of an airplane.

According to another advantageous embodiment of the invention, the stop of a program module is linked with an emergency program, which provides the successive program modules with a result, allowing them to continue to run in such a way that the output of the total electronic equipment is reduced, if necessary, but its reliability is maintained. In that case, an interrupt service routine backs up the interrupt, which is known per se. As soon as the interrupt is called up, the interrupt service routine is started and an emergency program suitable for the error situation is also started.

According to another advantageous embodiment, the monitoring boundaries for the memory are automatically generated by a linker, which is known per se. According to the invention, these boundaries are stored in an allocation table of the monitoring unit. For this, the individual program modules are initially linked, in a manner known per se, with a linker to form a program capable of running. The memory data are simultaneously logged into a monitoring memory, and the so-called linker list is generated. If test runs result in an error-free program sequence, the memory boundaries can be retrieved from the linker list and incorporated into the allocation table.

According to another embodiment, at least two times are entered into the allocation table for each program module. However, a larger number of monitoring times can also be entered into the allocation table for each module. Exceeding a first monitoring time, for example, causes the running program module to be stopped. The second, later time serves, for example, the monitoring of the orderly start-up of the emergency program stored in the interrupt routine, thus making sure that no errors can sneak in as a result of the emergency program.

In the following, an exemplary embodiment of the invention is shown with the aid of drawings and is explained further.

DETAILED DESCRIPTION OF THE PREFERRED EMBODIMENTS

Figure 1:
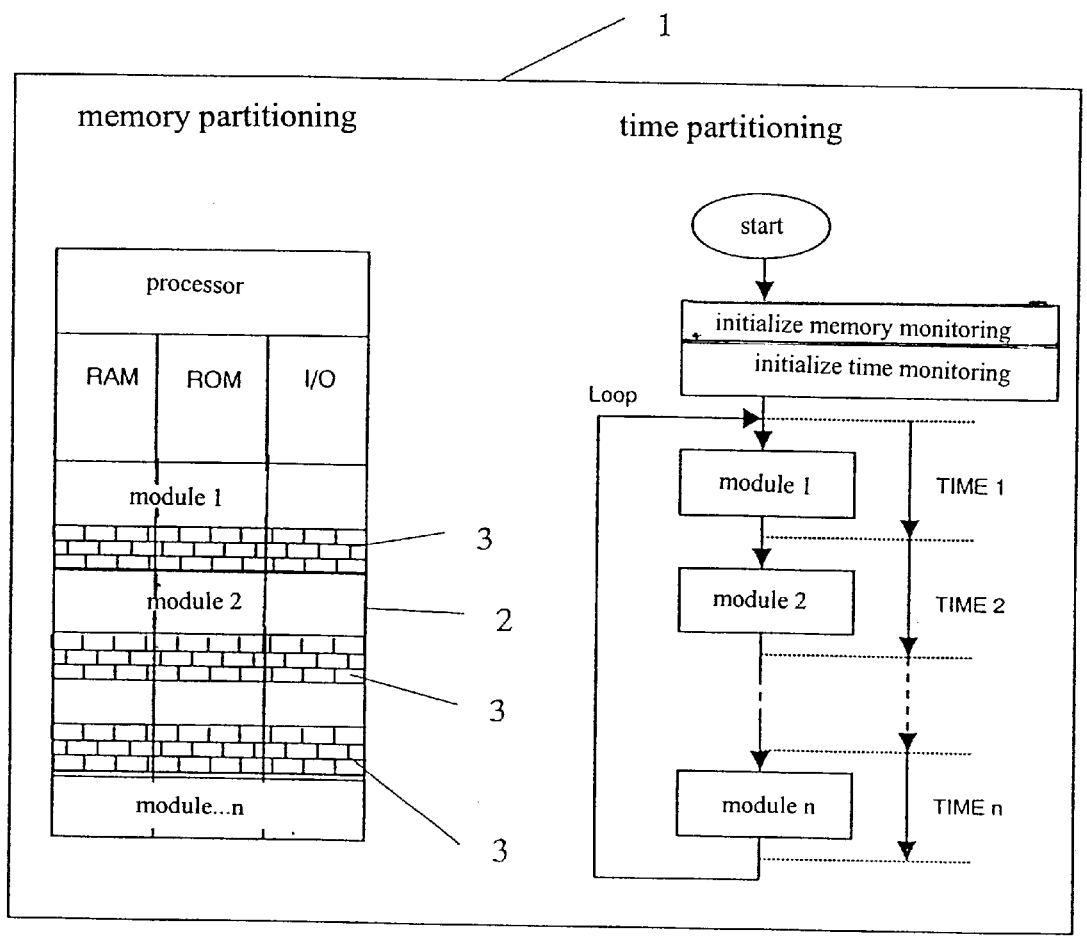
FIG. 1 is a representation in a graph of the basic functions of the partitioning according to the invention; with a memory partitioning as well as a time partitioning being shown.

According to the invention, the robust partitioning for one advantageous embodiment consists of the basic functions of a memory partitioning as well as a time partitioning. The memory partitioning is an essential element of the invention and is shown in FIG. 1 as a block table. The time partitioning is shown in FIG. 1 as a flow chart. Different program modules, module 1, module 2 to module n, share the processors ROM, RAM and I/O. According to the invention, the number of program modules that can be used is not limited, which is expressed clearly with the variable n. In practical applications, the number of program modules is limited by the physical size of the memory area 2 and the physical size of the system boundaries, which are generally given the reference number 1. The individual program modules, module 1, module 2 to module n, are robust partitioned, meaning in the representation with a graph they are assigned fixed memory areas that are also referred to as module 1, module 2, module n. The individual memory areas are separated by mentally impenetrable memory boundaries 3, which are shown as walls in the illustrated graph. A program module that is also partitioned is allocated to each memory area, module 1, module 2 to module n. As a result of the permanent allocation, the designations for the memory modules and the program modules can be used synonymously. For reasons of simplicity, these designations are also used synonymously in this text. The impenetrable memory areas 3 separate the individual program modules. The memory boundaries, however, do not function as access barriers to the system resources processor, RAM, ROM, I/O. The individual program modules have access to these system resources.

The time partitioning occurs along with the time monitoring, which makes available a time TIME 1, TIME 2 to TIME n for each program module, module 1, module 2 to module n. At the start-up of the system, during the initialization of the electronic equipment and the programs, the memory monitoring and the time monitoring are also initialized. If a program module exceeds the time interval provided, the time monitoring will stop this program module. Only the program module exceeding the time interval is stopped. The remaining program modules continue to operate. This is illustrated with the recursive arrow referred to as loop.

Figure 2:
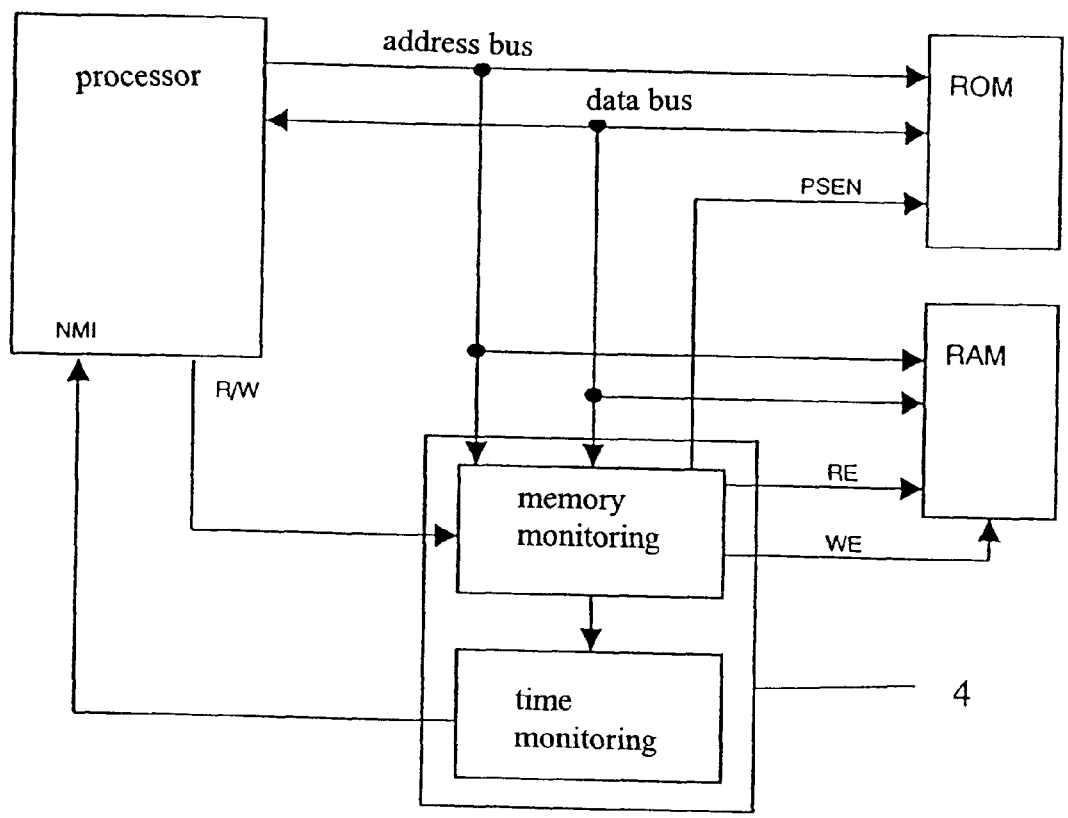
FIG. 2 is a block diagram for an embodiment according to the invention of an exemplary electronic environment.
Figure 3:
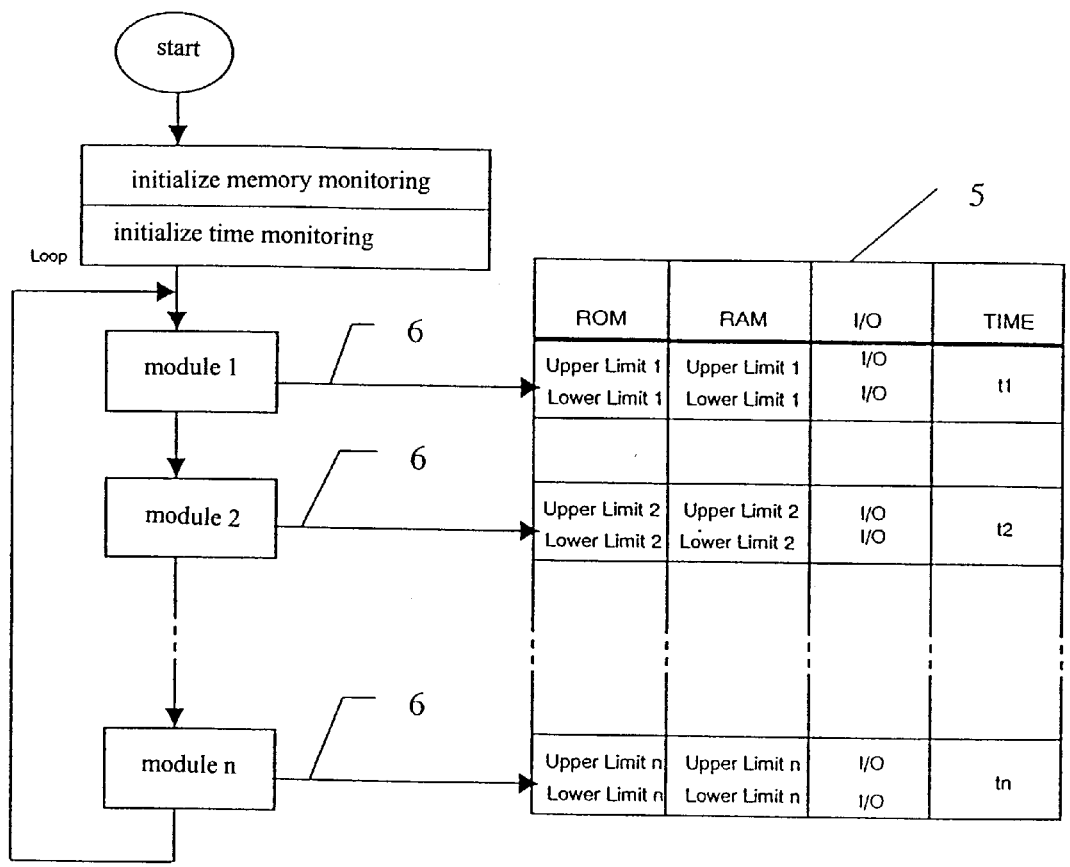
FIG. 3 is a representation in a graph of the allocation table according to the invention, as well as its allocation to the individual, partitioned program modules by means of an indicator.

FIG. 2 contains a block diagram of an embodiment according to the invention of the robust partitioning in an exemplary electronic environment. The monitoring unit 4 is configured as separate hardware-type component. The monitoring unit 4 with the basic functions memory monitoring and time monitoring is connected to a processor, a ROM (read only memory) and a RAM (read and access memory). By way of the status access R/W, the memory monitoring obtains information concerning which operation the processor should attempt to carry out. In accordance with an allocation table 5, stored in the memory monitoring unit and described in further detail in FIG. 3, the monitoring unit 4 releases the resources ROM or RAM for the processor, in accordance with the authorizations specified in the allocation table 5. For this, the monitoring unit 4 has access to the resource RAM via a write enable access WE and a read enable access RE, as well as to the resource ROM via a program storage enable access PSNE. The monitoring unit 4 also has access to the address bus and the data bus. The access to the address bus enables the monitoring unit 4 to check the address regions used by the processor in accordance with the allocation table 5. The address regions are checked by comparing the addresses used by the respectively active program module on the address bus with the addresses stored in the allocation table 5, which are permissible for the active program module. If the active program module uses addresses that are not permissible for the program module, the monitoring unit 4 diagnoses an error. This error is recorded and clearly allocated to the active program module, which has caused the error in the address violation. The monitoring unit 4 can access the data bus to decide which program module is respectively active. Via the data bus, the monitoring unit 4 checks which program module is activated in the processor and links the respectively active program module with the respectively associated line of the allocation table 5, in accordance with the specified linking rules. The graph in FIG. 3 shows a linking rule. If an address is positioned outside of one of the regions specified in the allocation table, the memory monitoring outputs an error signal to the time monitoring. The time monitoring is connected to the processor via a so-called non-mascable interrupt NMI and via this access can stop the operating sequence of the program module that has triggered the address violation. Additional connections exist in a manner known per se between the processor and the resource ROM, as well as the processor and the resource RAM.

The illustrated graph in FIG. 3 shows an allocation table 5, stored in the monitoring unit 4, as well as a rule for linking the individual program modules to the lines in the allocation table. Each program module, module 1, module 2 to module n, is assigned a line in the allocation table 5, which is symbolized in FIG. 3 by the indicators 6. The allocated, module-oriented memory boundaries upper limit 1, upper limit 2 to upper limit n, as well as lower limit 1, lower limit 2 to lower limit n and the allocated module-oriented processing times t1, t2 to tn are recorded in the allocation table 5 for the respective program modules. The columns in the allocation table 5 are assigned to the system resources ROM, RAM, I/O, TIME. Individual memory boundaries and times can be assigned to each program module, module 1, module 2 to module n, for each system resource ROM, RAM, I/O and TIME. The memory boundaries and times are advantageously recorded off-line into the allocation table 5, that is to say prior to the program start. It is important that the entries have a guaranteed protection, so that they can no longer be changed by an operating program module. If necessary, this can also be achieved by loading the list during the initialization phase of a program and by subsequently cutting off access by the running program with the aid of a safety bit. This safety bit is reset exclusively by the reset of a processor. With previously tested systems, it is advantageous if the allocation table 5 is stored with hardware, e.g., in the form of an EPROM.

Memory boundaries (lower limit, upper limit) can be obtained from the linker data while the realization times (t1, t2 to tn) must be specified by the program developer. They are entered into the allocation table 5 as shown. With its call, each program module (module 1, module 2 to module n) addresses in the processor the allocation table 5 line assigned to it and thus activates an individual monitoring mechanism. If a program module (e.g., the module 1) is interrupted by another program module (e.g., the module 2), the actual indicator 6 is stored in a monitoring stack, which is not shown here, but is known to the person skilled in the art. A new indicator 6 activates a corresponding new line in the allocation table 5, which remains effective as long as the assigned module is processed. Following completion, the original indicator 6 is again loaded by the monitoring stack and is activated. The time progression of the program module is cyclical, which is indicated by the arrow referred to as loop.

Parallel to the memory boundaries, the allocation table 5 contains module-oriented times (t1, t2 to tn). These are loaded into the time monitoring, for example during the call-up of a program module, and are then counted down. If the program module ends its processing before the value zero is reached, then the program module operates error-free. If zero is reached, an error is present and an interrupt will be initiated, which in turn must be linked by the programmer with a respective service. In that case, the result is advantageously recorded and an adequate emergency program is initiated, which stores the interrupt as interrupt service.

The invention has been described in detail with respect to Preferred embodiments, and it will now be apparent from the foregoing to those skilled in the art, that changes and modifications may be made without departing from the invention in its broader aspects, and the invention, therefore, as defined in the appended claims, is intended to cover all such changes and modifications as to fall within the true spirit of the invention.

What is claimed is:

1. A method for partitioning and monitoring soft-ware controlled electronic equipment (1), comprising a processor, at least one read only memory (ROM), at least one read and access memory (RAM) and one monitoring unit (4); said method comprising:

via the monitoring unit (4), dividing the memories (ROM, RAM) into individual memory areas (module 1, module 2 to module n) by use of a permanently stored allocation table (5), and assigning these areas permanently to individual program modules, which cannot be influenced by an operating program module, even in case of an error.

2. A method according to claim 1, further comprising via the monitoring unit (4), monitoring the processing times (t1, t2 to tn) of the individual program modules by using a time monitoring unit and the allocation table (5), with the time monitoring not being influencable by the operating program module, even in the case of an error.

3. A method according to claim 2, further comprising: upon detection of a violation of the memory boundaries (upper limit 1, upper limit 2 to upper limit n; lower limit 1, lower limit 2 to lower limit n), which are permanently stored in the allocation table, or a violation of the specified times (t1, t2, to tn) stored in the allocation table, recording the violation in the monitoring unit (4), and stopping the program module responsible for the violation with an interrupt.

4. A method according to claim 3, wherein the interrupt is backed by an interrupt service routine.

5. A method according to claim 1, including determining the memory boundaries (upper limit 1, upper limit 2 to upper limit n and lower limit 1, lower limit 2 to lower limit n) with the aid of a linker.

6. A method according to claim 2, wherein at least two times are recorded in the allocation table (5) for each program module.

7. A method according to claim 1, further comprising: upon detection of a violation of the memory boundaries (upper limit 1, upper limit 2 to upper limit n; lower limit 1, lower limit 2 to lower limit n), which are permanently stored in the allocation table, or a violation of the specified times (t1, t2, to tn) stored in the allocation table, recording the violation in the monitoring unit (4) and stopping the program module responsible for the violation with an interrupt.

8. A method according to claim 7, wherein the interrupt is backed by an interrupt service routine.

* * * * *